United States Patent [19]

Haytayan

[11] 4,098,171

[45] Jul. 4, 1978

[54] PNEUMATIC PISTON APPARATUS

[75] Inventor: Harry M. Haytayan, Lincoln, Mass.

[73] Assignee: Pneutek, Inc., Billercia,, Mass.

[21] Appl. No.: 715,854

[22] Filed: Aug. 19, 1976

[51] Int. Cl.[2] .......................... F15B 13/04; F16K 1/46

[52] U.S. Cl. ........................................ 91/461; 91/418; 251/63.5; 251/357; 251/358

[58] Field of Search .................. 227/130; 251/357, 63, 251/63.5, 356, 358; 91/461, 469, 418

[56] References Cited

U.S. PATENT DOCUMENTS

| | | | |
|---|---|---|---|
| 125,532 | 4/1872 | Bourne | 251/357 |
| 1,352,735 | 9/1920 | Egerton | 251/358 |
| 1,382,408 | 6/1921 | Bullen | 251/357 |
| 1,800,185 | 4/1931 | Thrush | 251/357 X |
| 2,397,269 | 3/1946 | Kelly | 251/357 X |
| 2,593,740 | 4/1952 | Faust | 251/357 |
| 3,094,900 | 6/1963 | Wandel et al. | 227/130 |
| 3,276,741 | 10/1966 | Nielsen et al. | 251/357 X |
| 3,331,391 | 7/1967 | Merdinyan | 251/357 X |
| 3,512,454 | 5/1970 | Perkins | 227/130 |
| 3,708,096 | 1/1973 | Burke, Jr. | 227/130 |
| 3,764,104 | 10/1973 | Kempton | 251/357 |
| 3,952,398 | 4/1976 | Haytayan | 227/130 X |

FOREIGN PATENT DOCUMENTS

| | | | |
|---|---|---|---|
| 2,405,799 | 8/1974 | Fed. Rep. of Germany | 251/358 |
| 230 of | 1859 | United Kingdom | 251/357 |

*Primary Examiner*—Irwin C. Cohen

*Attorney, Agent, or Firm*—Schiller & Pandiscio

[57] ABSTRACT

An improved pneumatic piston apparatus is provided wherein a movable poppet valve member employs at least one composite member exposed to air pressure which varies dynamically during the operation of the apparatus. Delamination of the composite member and resultant malfunction of the poppet valve are avoided by a novel construction in accordance with the principles of the present invention, which excludes the dynamically varying air pressure from access to the interface between the layers of the separate materials comprising the composite member. The effect achieved by the novel construction is further enhanced by the manner in which the composite member is retained on the poppet valve member. Unwanted movement of the piston conjointly with the motion of the poppet valve member is precluded in the invention by providing an air space therebetween.

9 Claims, 2 Drawing Figures

PNEUMATIC PISTON APPARATUS

BACKGROUND OF THE INVENTION

Figure 1:
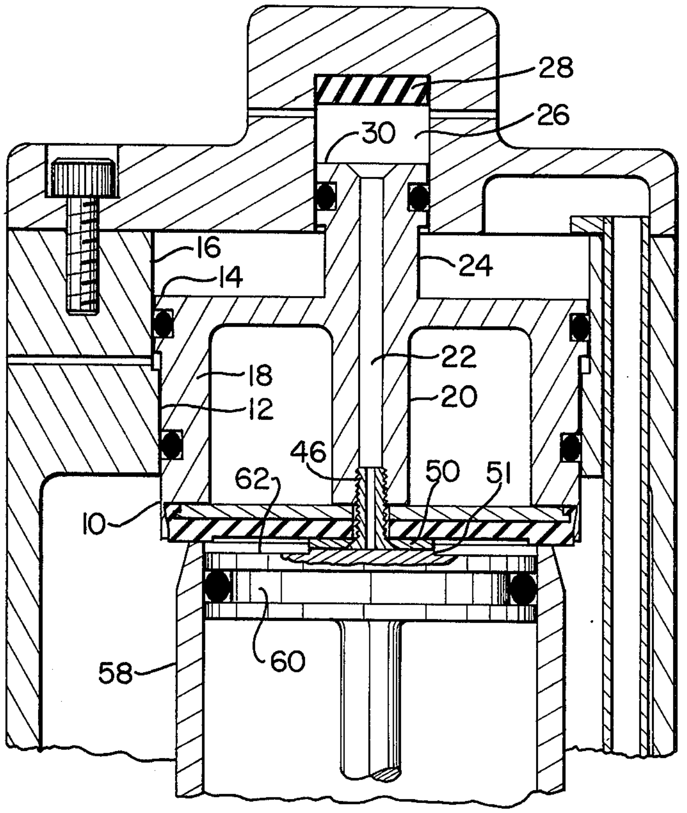

The present invention relates in general to new and improved pneumatic piston apparatus and in particular to an air-powered nail driver which employs a poppet valve that avoids the problems inherent in apparatus of this type and which interfaces with the piston in a novel and improved manner.

The use of poppet valves in pneumatic piston apparatus is well known, as evidenced by U.S. Pat. No. 3,952,398. Such valves generally have a movable member adapted for linear travel between pre-set limits in order to admit or to block the admission of a fluid, e.g., pressurized air. In present day applications, it is common for such valves to operate in an environment where the air pressure employed may exceed 200 psi. During the operation of the pneumatic piston apparatus the pressure may vary dynamically, sometimes in a different manner for different parts of the apparatus. Where the poppet valve includes composite members, i.e., members that include layers of different materials, delamination resulting in the separation of the layers of material may occur during the operation. Such action is particularly pronounced where the interface between such layers is exposed to the dynamically varying pressure conditions.

By way of example, in the above-mentioned U.S. Pat. No. 3,952,398 the movable poppet valve member terminates in a face plate which consists of a metal disk overlaid by a sealing pad. The purpose of the pad is to seal air out of the piston cylinder when the poppet valve member is in its downward position. Because of the dynamically varying pressure conditions that occur in the pneumatic piston driver illustrated in the patent, the air pressure acting on the exposed portion of the face plate during the operation of the apparatus has a tendency to force the resilient sealing pad away from its metal backing plate.

Such delaminating action has been observed in the operation of equipment of this type, notwithstanding the fact that the pad may be molded or cemented to its backing metal plate, or that it may be secured thereto by means of screws. Further, because the air pressure may act in a non-uniform manner on the exposed part, the delamination effect may occur at one point only, or it may occur at a number of points along the sealing pad. In either case, the poppet valve member is prevented from firmly seating on the cylinder in a manner where air is effectively sealed out. As a consequence, the piston driver may fail to operate efficiently, or it may be rendered completely inoperative by the delaminating action.

In apparatus of the type described, the applied air pressure normally urges the poppet valve member to one extreme of its axial travel to establish its rest position. In that position, the sealing pad forms a seal with the upper edge of the piston cylinder to prevent the application of the ambient air pressure to the upper surface of the piston. Simultaneously, air admitted to the underside of the piston urges the latter against the exterior surface of the sealing pad. When the piston driver is subsequently actuated and the poppet valve member moves to the opposite extreme of its travel to permit the application of pressurized air to the upper piston surface, the natural seal formed upon close contact between the exterior sealing pad surface and the upper piston surface may cause the piston to adhere to the face plate. When such adhesion occurs, the piston is sucked out of the piston cylinder with the upwardly moving poppet valve member and is incapable of executing its driving stroke. Thus, the operation of the piston apparatus becomes unpredictable.

OBJECTS OF THE INVENTION

It is a primary object of the present invention to provide new and improved pneumatic piston apparatus which is not subject to the foregoing disadvantages.

It is another object of the present invention to provide pneumatic piston apparatus wherein the delamination of composite members due to the applied air pressure is avoided.

It is a further object of the present invention to provide an improved poppet valve for pneumatic piston apparatus wherein delamination of the composite members due to the applied air pressure is avoided and proper seating of the valve for sealing purposes is maintained.

It is still another object of the present invention to provide an improved face plate for a poppet valve member wherein the bond between a stiff core and a resilient outer covering is maintained intact under dynamically varying pressure conditions.

It is yet another object of the present invention to provide pneumatic piston apparatus wherein separation between the movable poppet valve member and the contacting piston is readily effected when the valve member shifts positions.

Figure 2:
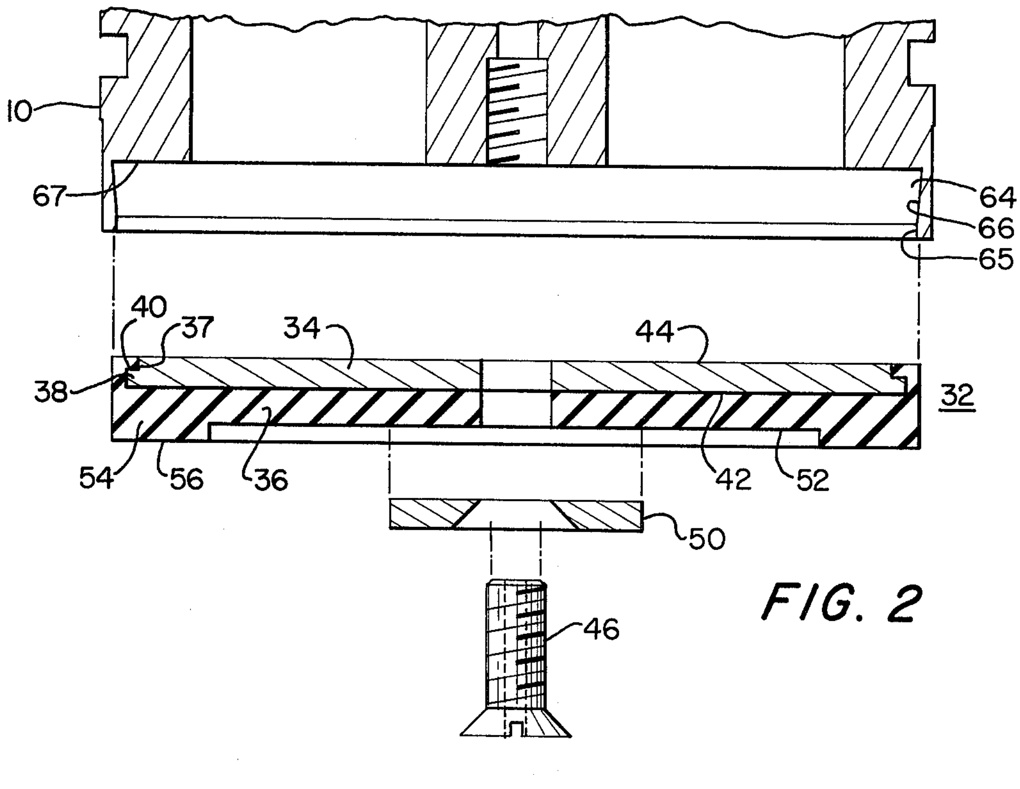

These and other objects of the invention, together with the features and advantages thereof will become apparent from the following detailed specification when considered with the accompanying drawings in which:

FIG. 1 illustrates the applicable portion of a pneumatic piston driver in accordance with the present invention; and FIG. 2 illustrates the inventive features of the novel construction of the apparatus of FIG. 1. in greater detail.

With reference now to the drawings, FIG. 1 shows a portion of the piston driver which is generally similar to the apparatus disclosed in U.S. Pat. No. 3,952,398 but incorporates the improvements provided by the present invention. A movable poppet valve member 10 is shown in its rest position in contact with the edge of a piston cylinder 58, which itself contains a movable piston 60. The lower portion of valve member 10 is slidably disposed in a cylindrical bore 12. The upper valve portion includes cylindrical flange 14 which is slidably contained within a cylindrical counterbore 16.

The lower portion of the valve member is defined by a cylindrical wall 18 which is coaxially spaced from a central column 20 that includes an axial bore 22. The major portion of valve member 10 is thus seen to be largely hollow to provide low inertia and rapid response in operation. Valve member 10 further includes a cylindrical extension 24 which resides slidably within a cylindrical cavity 26. The cavity terminates in a sealing pad 28 adapted to be engaged by the upper surface 30 of the extension 24 so as to define the upper limit of axial travel of the valve member.

As best seen from FIG. 2, which illustrates certain portions of the invention in exploded form for greater clarity, the poppet valve member terminates in a face plate which is generally designated by the reference numeral 32. The face plate comprises a relatively inflexible core 34 and a resilient cover 36. In a preferred embodiment of the invention a metal core may be used, partially encased by a cover consisting of a polyurethane material which is molded to the core. The core 34 is generally disk-shaped and includes an integral coaxial core boss 37 of a lesser diameter, which projects toward the interior of valve member 10. The core portion extending beyond the cylindrical surface of boss 37 thus constitutes a peripheral core flange 38 and a recess 40 is defined between the flange and the boss.

As shown in the drawings, the resilient cover 36 envelops only the exterior core surface 42, (the core surface facing the piston 60), and the core flange 38. Cover 36 terminates in recess 40 where it abuts the cylindrical surface of boss 37 to form a common, coplanar surface with the interior core surface 44.

A hollow screw 46 is screwed into the bottom interiorly threaded portion of the central column 20, the screw bore communicating with the axial bore 22 of the column. Screw 46 retains a washer 50 against face plate 32 to hold the latter in place on valve member 10. The head of screw 46 is seen to be flush with the exposed surface of washer 50, the latter being concentrically disposed on the exterior surface 52 of cover 36.

The edge portion of face plate 32 engages an interior recess 64 of cylindrical wall 18 of the valve member. While the lower recess defining surface 65 is parallel to the axis of the valve member, the other upper recess-defining surface 66 is seen to be cambered relative thereto. The end recess-defining surface 67 extends normal to the axis. In one embodiment of the invention, a camber of 5° from vertical is employed, such that the outside diameter of face plate 32 exceeds the inside diameter of recess 64 at the narrowest point of the latter. In order to fit the face plate into the recess, the resilient cover 36 is forced to conform to the surfaces 65 and 66. A lower portion of cover 36 is compressed radially by recess surface 65 and as a consequence a higher portion of the cover is caused to expend radially so as to conform and tightly engage recess surface 66. A further result is that the margin of the face plate us urged against recess surface 67, so that the portion of cover 36 occupying recess 40 is protected against separation from core 34.

The exterior surface of cover 52 is concentrically relieved to define a raised peripheral lip 54 on the cover 36. Lip 54 terminates in a sealing surface 56, normal to the common axis, which is adapted to resiliently engage the edge of piston cylinder 58. It will thus be clear that the surface presented to the outside by the composite face plate does not expose the interface between the core and its cover. As a consequence, neither static nor dynamically varying high pressure conditions encountered during the operation of the piston driver are capable of separating the cover 36 from the core 34. Thus, the resilient peripheral sealing surface 56, which is ground flat in a preferred embodiment to assure that it is normal to the common axis, continues to seat properly on the edge of piston cylinder 58 during repeated operations of the valve member 10.

In the embodiment illustrated in the drawings, washer 50 has a thickness that exceeds the height of peripheral lip 54. Thus, the washer, in conjunction with a coaxial boss 51 on the upper piston surface 62, assures that the latter surface will remain spaced from the exterior surface 52 of the cover 36. Preferably a spacing of at least 1/32 of an inch is maintained between these surfaces.

The presence of the air space prevents a natural seal from forming between surface 62 and surfaces 52 and 56. When upward movement of valve member 10 occurs upon actuation of the pneumatic piston apparatus, piston 60 remains in operating position within piston cylinder 58. Thus, in contrast to the operation of prior art apparatus where the piston is occasionally sucked out of the cylinder when the valve member moves to its upper position, the piston in the present invention is always ready to use in the position shown. Accordingly, the reliability of the pneumatic piston apparatus herein is significantly enhanced.

It will be clear that the present invention lends itself to a number of modifications without departing from the basic principles of the invention. Thus, various arrangements are possible to assure that an adequate air space is maintained between the exterior cover surface 52 and upper piston surface 62. For example, the height of either washer 50 or boss 51 alone may be selected, to the exclusion of the other part, to provide the desired air space.

Various choices of materials are possible for use in the resilient cover as well as for the relatively stiff core of the face plate. In a preferred embodiment the core consists of a metal disk and the enveloping cover uses a tough but resilient polyurethane material. The polyurethane cover is preferably molded to the metal core, but other securing means, such as cementing or the use of fastening screws, may be readily substituted. Similarly, although a hollow metal screw is described and illustrated for fastening washer 50 to valve member 10, other fastening means, e.g., a threaded bushing, may be employed.

The dimensions described and illustrated are exemplary only and the invention is not intended to be so limited. Thus, different angles may be used for the cambered surface of recess 64. Likewise, various spacings may be employed between face plate surface 52 and piston surface 62 when the valve member 10 is in its rest position.

While a hollow poppet valve member 10 is preferred for reasons of low inertia and high mobility, the invention is not so limited. Indeed, the general structure of the piston driver is exemplary only, the invention being applicable to various embodiments of such devices.

From the foregoing discussion it will be apparent that numerous modifications, substitutions and changes will now occur to those skilled in the art, all of which fall within the spirit and scope of the present invention, as defined by the appended claims.

What is claimed is:

1. A poppet valve of the type having a movable valve member adapted for travel in an axial direction;

said movable valve member comprising a cylindrical outside wall coaxially spaced from a hollow central column;

a face plate terminating one end of said valve member, said face plate comprising a substantially disk-shaped core;

a boss integral with said core and coaxially projecting from a core surface interior to said valve member to form a peripheral core flange, said boss and said flange jointly defining a recess therebetween;

said face plate further including a resilient cover molded to said core, said cover enveloping the exterior core surface and said flange and abutting said core boss in said recess to form a common coplanar surface with said interior core surface;

the exterior surface of said cover being centrally relieved to define a raised peripheral lip projecting in an axial direction, said lip presenting a resilient, peripheral sealing surface normal to the axis of said valve member;

a washer disposed on the exterior cover surface and extending beyond said sealing surface in an axial direction; and a hollow screw flush with said washer extending through the latter and said face plate and threading into said central column.

2. The apparatus of claim 1 wherein said cylindrical wall of said valve member terminates in an interior recess including a cambered surface;

said last recited recess narrowing toward the outside of said valve member to a diameter less than the uncompressed outside diameter of said face plate and being adapted to receive said face plate in a forced fit.

3. A poppet valve of the type having a movable valve member adapted for travel in an axial direction;

said valve member having a substantially cylindrical configuration terminating in a face plate at one end;

said face plate comprising a disk-shaped core having substantially parallel, planar interior and exterior surfaces, said core including a coaxial flange coplanar with said exterior surface and defining a peripheral recess adjacent said interior core surface;

said face plate further including a resilient cover secured to said core, said cover enveloping said exterior core surface and said flange and extending into said core recess;

the exterior surface of said cover including a peripheral sealing surface normal to the axis of said valve member;

a coaxial washer; and screw means extending through said washer, said cover and said face plate and being threaded into the body of said valve member, the head of said screw means being flush with said washer.

4. The apparatus of claim 3 wherein the thickness of said cover in said recess is substantially equal to the depth of said recess to form a surface that is coplanar with said interior core surface.

5. The apparatus of claim 3 wherein the exterior surface of said cover is centrally relieved to define a peripheral lip, said lip terminating in said peripheral sealing surface.

6. A face plate for a poppet valve member adapted to operate in a dynamic high-pressure environment to perform a sealing function, said face plate comprising:

a stiff disk-shaped core having first and second parallel, planar surfaces;

said core including a coaxial flange coplanar with said second surface to define a peripheral recess in said first surface;

a resilient cover secured to said second core surface and said flange, said cover enveloping said flange and terminating in said recess to form a common coplanar surface with said first core surface;

the cover portion secured to said second core surface being centrally relieved to define a peripheral lip terminating in a resilient peripheral sealing surface substantially parallel to said first and second surfaces;

a coaxial washer; and screw means extending through said washer, said cover, and said face plate and the head thereof adapted to seat within said washer flush therewith.

7. In a pneumatic piston apparatus:

a cylinder;

a piston disposed within said cylinder adapted to travel in an axial direction upon the application of air pressure;

a poppet valve coaxial with said cylinder and including a valve member adapted to move in an axial direction;

a face plate disposed on said valve member and including a disk-shaped core comprising a pair of parallel planar surfaces, a peripheral flange integral with said core and coplanar with one of said core surfaces facing said piston;

a resilient cover secured on said core, said cover enveloping said flange and said one core surface;

said cover further including an exterior face plate surface bounded by a raised peripheral lip, said lip presenting a resilient peripheral sealing surface to the edge of said cylinder normal to the common axis;

means for spacing said piston from said exterior face plate surface when said valve member is in a position where said sealing surface engages the edge of said cylinder, said spacing means comprising a washer coaxially secured to said exterior face plate surface; and a coaxial boss integral with said piston and facing said washer.

8. A poppet valve of the type having a movable valve member adapted for travel in an axial direction;

said valve member having a substantially cylindrical configuration including a cylindrical wall terminating in an interior recess at one end and an end wall at the opposite end, and a central column attached to said end wall and spaced from said cylindrical wall so as to define an open ended interior space;

a face plate positioned in said interior recess and closing off said interior space, said face plate comprising a disk-shaped core having substantially parallel, planar interior and exterior surfaces, said core including a coaxial flange coplanar with said exterior surface and defining a peripheral recess adjacent said interior core surface;

said face plate further including a resilient cover secured to said core, said cover enveloping said exterior core surface and said flange and extending into said peripheral recess;

the exterior surface of said cover including a peripheral sealing surface normal to the axis of said valve member;

said interior recess being defined at least in part by a wall surface which is cambered relative to the common axis;

said cambered surface forming a constriction progressively narrowing toward the outside of said interior recess to a diameter less than the uncompressed outside diameter of said face plate;

a peripheral portion of said face plate engaging and conforming to said cambered wall surface; and means for fastening said face plate to said control column.

9. In a pneumatic piston apparatus:

cylinder;

a piston disposed within said cylinder adapted to travel in an axial direction upon the application of air pressure;

a poppet valve coaxial with said cylinder and including a valve member adapted to move in an axial direction;

said valve member including a cylindrical wall;

an interior recess positioned at one end of said wall defined by first and second wall surfaces normal and cambered respectively relative to said common axis;

said cambered surface forming a constriction progressively narrowing toward the outside of said interior recess;

a face plate retained in said interior recess in resiliently conforming relationship therewith;

said face plate including a disk-shaped core comprising a pair of parallel planar surfaces, a peripheral flange integral with said core and coplanar with one of said core surfaces facing said piston;

a resilient cover secured on said core, said cover enveloping said flange and said one core surface;

said cover further including an exterior face plate surface bounded by a raised peripheral lip, said lip presenting a resilient peripheral sealing surface to the edge of said cylinder normal to the common axis; and means for spacing said piston from said exterior face plate surface when said valve member is in a position where said sealing surface engages the edge of said cylinder.

* * * * *